(12) United States Patent
Zhang et al.

(10) Patent No.: US 8,713,275 B2
(45) Date of Patent: Apr. 29, 2014

(54) MEMORY ACCESS MONITORING METHOD AND DEVICE

(75) Inventors: Xiaofeng Zhang, Hangzhou (CN); Fan Fang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 13/341,416

(22) Filed: Dec. 30, 2011

(65) Prior Publication Data

US 2012/0272029 A1 Oct. 25, 2012

Related U.S. Application Data

(63) Continuation of application No. PCT/CN2011/073018, filed on Apr. 19, 2011.

(51) Int. Cl.
*G06F 13/00* (2006.01)

(52) U.S. Cl.
USPC .... 711/165; 711/100; 711/154; 711/E12.001; 711/E12.002

(58) Field of Classification Search
USPC .......... 711/165, 100, 154, E12.001, E12.002
See application file for complete search history.

(56) References Cited

U.S. PATENT DOCUMENTS 5,727,150 A 3/1998 Laudon et al.
6,035,378 A 3/2000 James

FOREIGN PATENT DOCUMENTS

| CN | 1808402 A | 7/2006 |
|---|---|---|
| CN | 101187948 A | 5/2008 |
| CN | 101561775 A | 10/2009 |

OTHER PUBLICATIONS

Extended European Search Report in corresponding European Patent Application No. 11750199.9 (Jul. 20, 2012).
Chaudhuri, Mainak, "PageNUCA: Selected Policies for Page-grain Locality Management in Large Shared Chip-multiprocessor Caches," IEEE 15th International Symposium on High Performance Computer Architecture, Feb. 14, 2009, IEEE, Washington, D.C.
International Search Report in corresponding PCT Application No. PCT/CN2011/073018 (Sep. 1, 2011).

*Primary Examiner* — Midys Rojas
(74) *Attorney, Agent, or Firm* — Leydig, Voit & Mayer, Ltd.

(57) ABSTRACT

A memory access monitoring method and a memory access monitoring method device are disclosed, The method comprises: performing coarse grain monitoring on local memory pages, if a hot page with coarse grain monitoring exists in the local memory pages, requesting an operating system to perform an optimized migration for the content of the hot page, and if a half hot page with coarse grain monitoring exists in the local memory pages, initiating fine grain monitoring to the half hot page; and performing fine grain monitoring on the half hot page, if a hot area with fine grain monitoring exists in the half hot page, requesting the operating system to perform an optimized migration for the content of the hot area.

17 Claims, 4 Drawing Sheets

MEMORY ACCESS MONITORING METHOD AND DEVICE

CROSS-REFERENCE TO RELATED APPLICATIONS

This application is a continuation of International Application No. PCT/CN2011/073018, filed on Apr. 19, 2011, which is incorporated herein by reference in its entirety.

FIELD OF THE APPLICATION

Embodiments of the present application relate to the field of communications, and more particularly, to a memory access monitoring method and a memory access monitoring device.

BACKGROUND OF THE APPLICATION

Under Non-Uniform Memory Access (NUMA) architecture, the overheads for memory access at a remote end and a local end differ markedly, and an excessive memory access at the remote end leads to abrupt decline of the system performance. Monitoring of cross-nodes memory access can identify hot cross-nodes data access pages, dynamically adjust memory distribution, raise local memory access proportion, and enhance overall system performance.

In the related art, each node is provided with a memory access monitoring module to count access circumstances (read and write counts) of remote and local nodes for each page. If it is found that the frequency whereby a remote node accesses a certain page exceeds a predetermined threshold value, the monitoring module will notify the operating system through interruption or other ways, and the operating system will perform an optimizing process for the page.

It is usual in the related art to use a page grain with the size of 4K to perform the monitor, but the relatively fine page grain requires a great number of counters to monitor memory access for a memory capacity exceeding 100 G, and the hardware overhead is unduly high.

SUMMARY OF THE APPLICATION

Embodiments of the present application provide a memory access monitoring method and a memory access monitoring device to address the defect of unduly high hardware overhead for memory access in the related art, achieve large coverage of memory access monitoring with relatively low hardware overhead, and enhance optimization efficiency of memory access.

An embodiment of the present application provides a memory access monitoring method, comprising:

performing coarse grain monitoring on local memory pages, if a hot page with coarse grain monitoring exists in the local memory pages, requesting an operating system to perform an optimized migration for the content of the hot page, and if a half hot page with coarse grain monitoring exists in the local memory pages, initiating fine grain monitoring to the half hot page; and performing fine grain monitoring on the half hot page, if a hot area with fine grain monitoring exists in the half hot page, requesting the operating system to perform an optimized migration for the content of the hot area.

An embodiment of the present application provides a memory access monitoring device, comprising:

a coarse grain monitoring module for performing coarse grain monitoring on local memory pages, if a hot page with coarse grain monitoring exists in the local memory pages, instructing a monitor controlling module to request an operating system to perform an optimized migration for the content of the hot page, and if a half hot page with coarse grain monitoring exists in the local memory pages, initiating, by the monitor controlling module, fine grain monitoring to the half hot page;

a fine grain monitoring module for performing fine grain monitoring on the half hot page, and if a hot area with fine grain monitoring exists in the half hot page, instructing the monitor controlling module to request the operating system to perform an optimized migration for the content of the hot area; and the monitor controlling module for instructing the coarse grain monitoring module to initiate coarse grain monitoring to the local memory pages, and requesting the operating system to perform the optimized migration for the content of the hot page monitored by the coarse grain monitoring module, if the coarse grain monitoring module monitors that the half hot page with coarse grain monitoring exists in the local memory pages, instructing the fine grain monitoring module to initiate the fine grain monitoring to the half hot page, and requesting the operating system to perform the optimized migration for the content of the hot area monitored by the fine grain monitoring module.

The combination of coarse grain monitoring and fine grain monitoring is employed in the memory access monitoring method and device according to the embodiments of the present application, whereby the coarse grain monitoring is firstly performed, and the fine grain monitoring is then performed on the hot page obtained by the coarse grain monitoring, so as to reduce the number of counters required by memory access monitoring, thus making it possible not only to achieve large coverage of memory access monitoring with relatively low hardware overhead, but also to perform fine grain monitoring on essential data pages, to effectively recognize the cross-nodes hot area which needs to be optimized, and to enhance the memory access optimization efficiency in NUMA architecture when applied in the NUMA architecture.

BRIEF DESCRIPTION OF THE DRAWINGS

To make clearer the explanation of technical solutions of the embodiments of the present application or of the related art, the drawings needed in the description of the embodiments or the related art are briefly illustrated below. Apparently, the drawings illustrated below are directed to some embodiments of the present application, and it is possible for persons ordinarily skilled in the art to deduce other drawings from these drawings without creative effort.

DETAILED DESCRIPTION OF THE EMBODIMENTS

To make clearer the objectives, technical solutions and advantages of the embodiments of the present application, the technical solutions according to the embodiments of the present application are clearly and completely described below with reference to the drawings. Apparently, the embodiments as described below are merely partial, rather than entire, embodiments of the present application. On the basis of the embodiments of the present application, all other embodiments obtainable by persons ordinarily skilled in the art without creative effort shall all fall within the protection scope of the present application.

Figure 1:
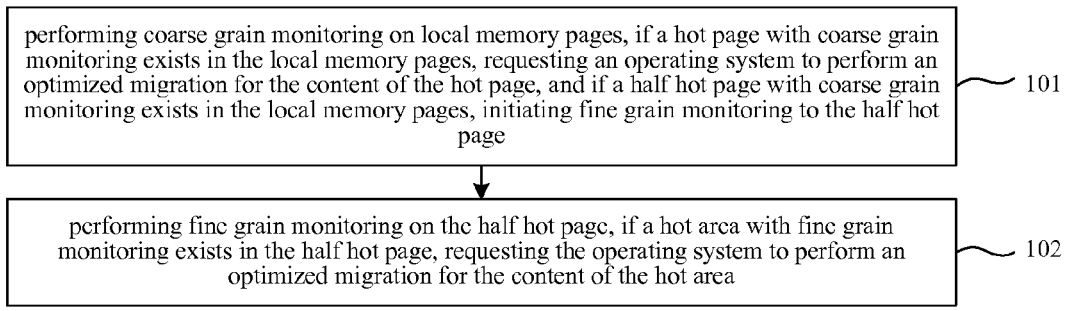
FIG. 1 shows a flowchart illustrating a memory access monitoring method according to a first embodiment of the present application.

FIG. 1 shows a flowchart illustrating a memory access monitoring method according to a first embodiment of the present application. As shown in FIG. 1, the memory access monitoring method may comprise the following steps:

Step 101—performing coarse grain monitoring on local memory pages, if a hot page with coarse grain monitoring exists in the local memory pages, requesting an operating system to perform an optimized migration for the content of the hot page, and if a half hot page with coarse grain monitoring exists in the local memory pages, initiating fine grain monitoring to the half hot page.

The step 101 may specifically comprise the following steps:

Step 1011—storing, in a table entry of a coarse grain monitoring table, a count value of each counter corresponding to each node accessing a coarse grain page in a system respectively, the coarse grain page is obtained by coarse grain dividing the local memory pages;

Step 1012—determining, according to an access amount by which each node in the system accesses a coarse grain page, whether a remote access rate by which the coarse grain page is accessed by a remote node exceeds a first predetermined threshold value. If yes, the coarse grain page is a hot page, and step 1013 is executed, otherwise step 1014 is executed;

Step 1013—requesting the operating system to perform the optimized migration for the content of the hot page, and ending the process;

Step 1014—determining whether a total remote access rate by which the coarse grain page is accessed by all remote nodes exceeds a second predetermined threshold value. If yes, the coarse grain page is a half hot page, the fine grain monitoring to the half hot page is initiated, and step 102 is executed.

Step 102—performing fine grain monitoring on the half hot page, and if a hot area with fine grain monitoring exists in the half hot page, requesting the operating system to perform an optimized migration for the content of the hot area.

The step 102 may specifically comprise the following steps:

Step 1021—storing, in a table entry of a fine grain monitoring table, a count value of each counter corresponding to each node accessing a fine grain area in a system respectively, the fine grain area is obtained by fine grain dividing the half hot page;

Step 1022—determining, according to access amount by which each node in the system accesses a fine grain area, whether a remote access rate by which the fine grain area is accessed by a remote node exceeds a third predetermined threshold value. If yes, the fine grain area is a hot area, and the operating system is requested to perform the optimized migration for the content of the hot area.

The method of using counters to make statistics about the access amount by which each coarse grain page or each fine grain area is accessed by a node may specifically comprise the following steps:

initiating, if a local node in a system accessing a coarse grain page is detected, a count value of a counter in a coarse grain monitoring module corresponding to the local node accessing the coarse grain page to be added by "1";

instructing, if a remote node in a system accessing a coarse grain page is detected, a count value of a counter in the coarse grain monitoring module corresponding to the remote node accessing the coarse grain page to be added by "1";

initiating, if a local node in a system accessing a fine grain page is detected, a count value of a counter in the coarse grain monitoring module corresponding to the local node accessing the fine grain page to be added by "1";

initiating, if a remote node in a system accessing a fine grain page is detected, a count value of a counter in the coarse grain monitoring module corresponding to the remote node accessing the fine grain page to be added by "1".

Moreover, the memory access monitoring method may further comprise a step of aging, which can be specifically divided into either one of the following circumstances:

Circumstance 1: resetting, if an aging signal of a coarse grain page is received, each counter to which the coarse grain page corresponds, and deleting the table entry corresponding to the coarse grain page from the coarse grain monitoring table; the circumstance 1 can be performed after the table entry of a certain coarse grain page has been established in the coarse grain monitoring table in step 1011.

Circumstance 2: resetting, if an aging signal of a fine grain area, each counter to which the fine grain area corresponds, and deleting the table entry corresponding to the fine grain area from the fine grain monitoring table; the circumstance 2 can be performed after the table entry of a certain fine grain area has been established in the fine grain monitoring table in step 1021.

The coarse grain page in an embodiment of the present application may be, for example, a memory space sized as 2M, 4M, 16M, 64M, 512M, 1 G, 4 G, or 16 G etc., the fine grain area may be, for example, a memory space sized as 4K, 8K, 16K, 32K or 64K etc., and the coarse grain page is larger than a memory space occupied by the fine grain area. Their sizes are not specifically limited in embodiments of the present application.

The combination of coarse grain monitoring and fine grain monitoring is employed in the memory access monitoring method according to this embodiment, whereby the coarse grain monitoring is firstly performed, and the fine grain monitoring is then performed on the hot page obtained by the coarse grain monitoring, so as to reduce the number of counters required by memory access monitoring, thus making it possible not only to achieve large coverage of memory access monitoring with relatively low hardware overhead, but also to perform fine grain monitoring on essential data pages, to effectively recognize a cross-nodes hot area which needs to be optimized, and to enhance the memory access optimization efficiency in NUMA architecture when applied in the NUMA architecture.

Second Embodiment

Figure 2A:
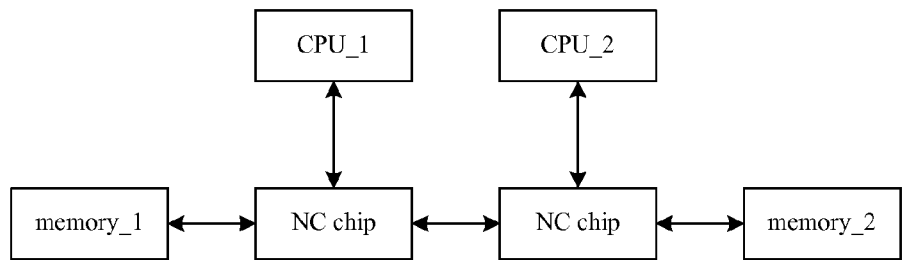
FIG. 2a shows a schematic diagram illustrating a memory access monitoring method according to a second embodiment of the present application applied in NUMA architecture.

FIG. 2a shows a schematic diagram illustrating a memory access monitoring method according to a second embodiment of the present application applied in NUMA architecture, in which a Node Controller (NC) chip is a communication chip accessing between nodes in the NUMA architecture, and is used for all cross-nodes memory access. A memory access monitoring device can be disposed on the NC chip, as shown in FIG. 2a. Suppose memory_1 is a local memory page, CPU_1 is a local node of memory_1, CPU_2 is a remote node of memory_1, and memory_2 is a remote memory to which CPU_2 corresponds.

Figure 2B:
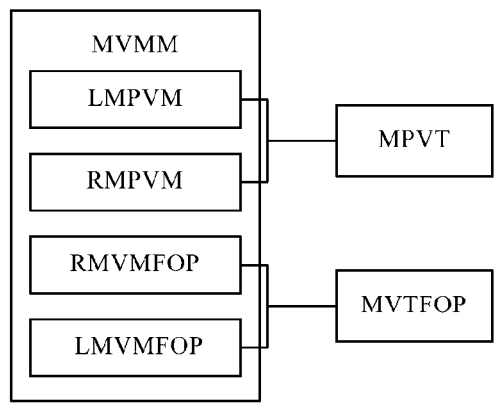
FIG. 2b shows a structural schematic diagram illustrating the memory access monitoring method according to the second embodiment of the present application applied in a NC chip of the NUMA architecture.

FIG. 2b shows a structural schematic diagram illustrating the memory access monitoring method according to the second embodiment of the present application applied in a NC chip of the NUMA architecture. As shown in FIG. 2b, the monitor controlling module can be a Memory Visit Managing Model (MVMM) of the NC chip, the coarse grain monitoring module is stored therewith a coarse grain monitoring table of memory page access (Memory Page Visit Table, MPVT), and the fine grain monitoring module is stored therewith a fine grain monitoring table of page memory access (Memory Visit Table For One Page, MVTFOP). The monitor controlling module may comprise a Remote Memory Page Visit Message (RMPVM) unit, a Local Memory Page Visit Message (LMPVM) unit, a Remote Memory Visit Message For One Page (RMVMFOP) unit, and a Local Memory Visit Message For One Page (LMVMFOP) unit, wherein the table entry format of the MPVT is as shown in the following Table 1, each monitored page corresponds to one table entry (for instance, one row of Page 1 in Table 1), each table entry comprises the access amount with which this page is accessed by being read or accessed by being written by N number of nodes, and N is the number of nodes included in the system. Hash calculation can be used to search the table entries, to thereby enhance the searching efficiency.

TABLE 1

Table Entry Format of MPVT

| (Page number) | (Local read counter) | (Local write counter) | (Node 1 read counter) | (Node 1 write counter) | (Node 2 read counter) | (Node 2 write counter) | ... | (Node N write counter) | (Node N read counter) |
|---|---|---|---|---|---|---|---|---|---|
| Page 1 | | | | | | | | | |
| Page 2 | | | | | | | | | |
| ... | | | | | | | | | |
| Page M | | | | | | | | | |

Figure 2C:
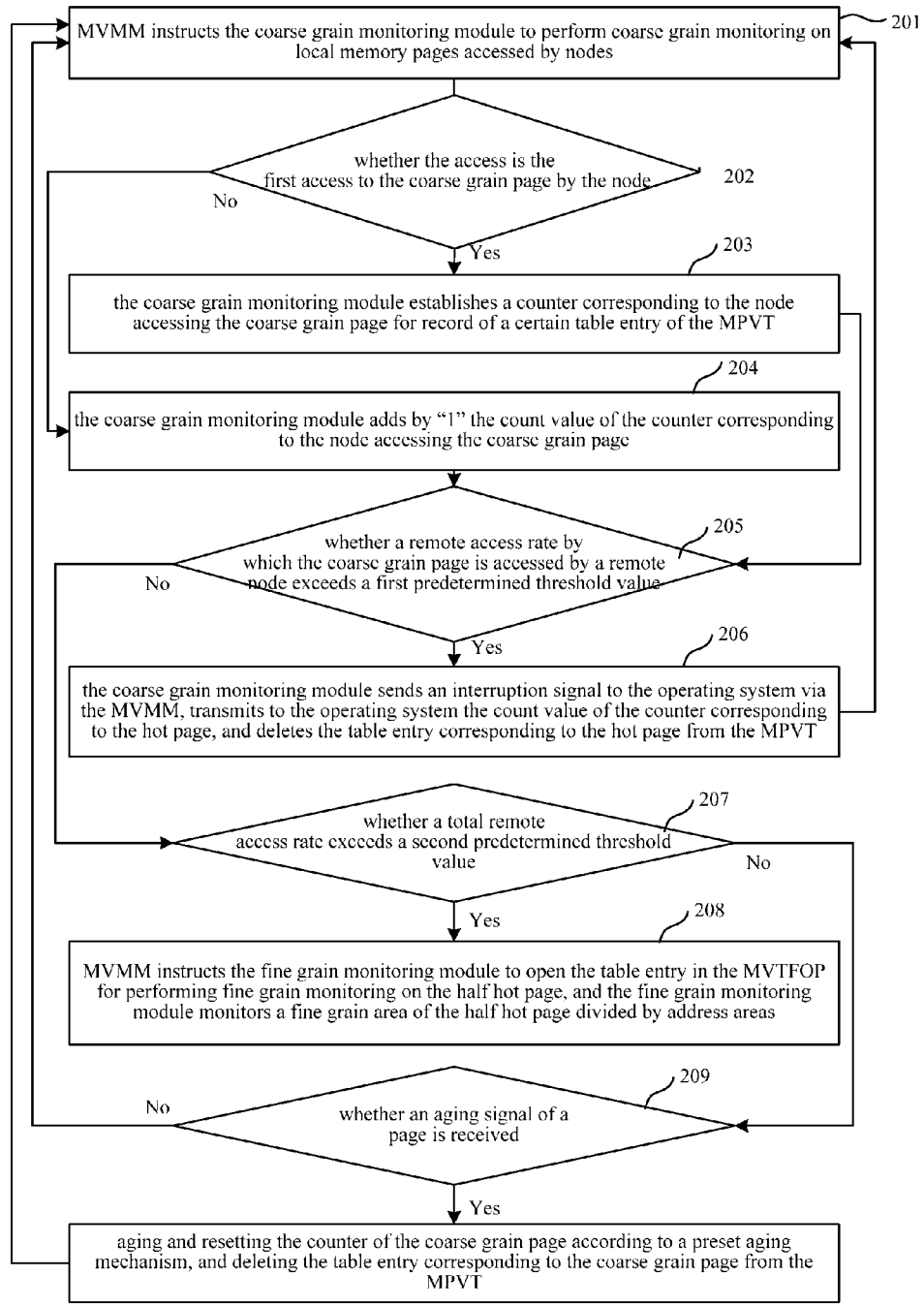
FIG. 2c shows a schematic diagram illustrating a coarse grain monitoring in the memory access monitoring method according to the second embodiment of the present application.

FIG. 2c shows a schematic diagram illustrating a coarse grain monitoring in the memory access monitoring method according to the second embodiment of the present application. As shown in FIGS. 2c and 2b, the coarse grain monitoring may specifically comprise the following steps:

Step 201—the MVMM of the NC chip can instruct the coarse grain monitoring module to perform coarse grain monitoring on local memory pages accessed by nodes, for example, if the RMPVM unit of the MVMM detects a remote access, or the LMPVM unit of the MVMM detects a local access, the coarse grain monitoring module can be instructed to perform coarse grain monitoring on local memory pages accessed by nodes.

Step 202—the coarse grain monitoring module determines whether the access is the first access of the coarse grain page by the node. If yes, step 203 is executed, otherwise step 204 is executed.

Step 203—the coarse grain monitoring module establishes a counter corresponding to the node accessing the coarse grain page for record of a certain table entry of the MPVT, and step 205 is executed.

Step 204—since the record of the certain table entry of the MPVT already has a counter corresponding to the node accessing the coarse grain page, the coarse grain monitoring module can add by "1" the count value of the counter corresponding to the node accessing the coarse grain page, and step 205 is executed.

Step 205—the coarse grain monitoring module determines whether a remote access rate by which the coarse grain page is accessed by a certain remote node exceeds a first predetermined threshold value according to each counter of a certain page in the MPVT. For example, if the count value of a counter for a remote node A accessing the coarse grain page is "300", the count value of a counter for a local node B accessing the coarse grain page is "3", and the first predetermined threshold value is "50", then the remote access rate "300/3=100" exceeds the first predetermined threshold value. If the first predetermined threshold value is exceeded, it is determinable that the coarse grain page is a hot page, and step 206 is executed, otherwise step 207 is executed.

Step 206—the coarse grain monitoring module sends an interruption signal to the operating system via the MVMM, transmits to the operating system the count value of the counter corresponding to the hot page, and deletes the table entry corresponding to the hot page from the MPVT to enable the operating system to perform an optimized migration for the hot page, for example, by migrating the content stored in the hot page to a remote memory corresponding to the remote node for storage. Then the process returns to step 201 for continued monitoring.

Step 207—the coarse grain monitoring module determines whether a total remote access rate exceeds a second predetermined threshold value (namely indicating that the page is simultaneously frequently accessed by many remote nodes) according to a sum of count values of counters for all remote nodes accessing a certain coarse grain page. If yes, it is determinable that the coarse grain page is a half hot page, and step 208 is executed, otherwise step 209 is executed (if there is no aging module, it is also possible to return to execute step 201), this is so because if such large page grains as 4M, 1 G etc. are used to monitor, a coarse grain page may be simultaneously accessed by several nodes, and it may be difficult for the remote access rate by which a single remote node accesses a certain coarse grain page to exceed the predetermined threshold value. In order to enhance optimization efficiency, it is possible to determine whether fine grain monitoring is required according to the total remote access rate by which several remote nodes access a certain coarse grain page.

Step 208—the MVMM instructs the fine grain monitoring module to open the table entries in the MVTFOP for performing fine grain monitoring on the half hot page, and the fine grain monitoring module monitors fine grain areas of the half hot page divided by address areas. Moreover, the table entry corresponding to the half hot page is deleted from the MPVT, and the process returns to execute step 201 for continued monitoring after completion of the fine grain monitoring. The fine grain table entry format stored in the MVTFOP may refer to the coarse grain table entry format of the MPVT in Table 1.

Step 209—an aging module (memory page age message) determines whether an aging signal of a certain page is received. If yes, the counter of the coarse grain page is aged and reset according to a preset aging mechanism, and the process returns to execute step 201 after the table entry corresponding to the coarse grain page is deleted from the MPVT, otherwise the process directly returns to step 201. There may as well be no temporal sequence between step 208 and step 209, as step 209 may be executed at any time according to the aging signal.

Figure 2D:
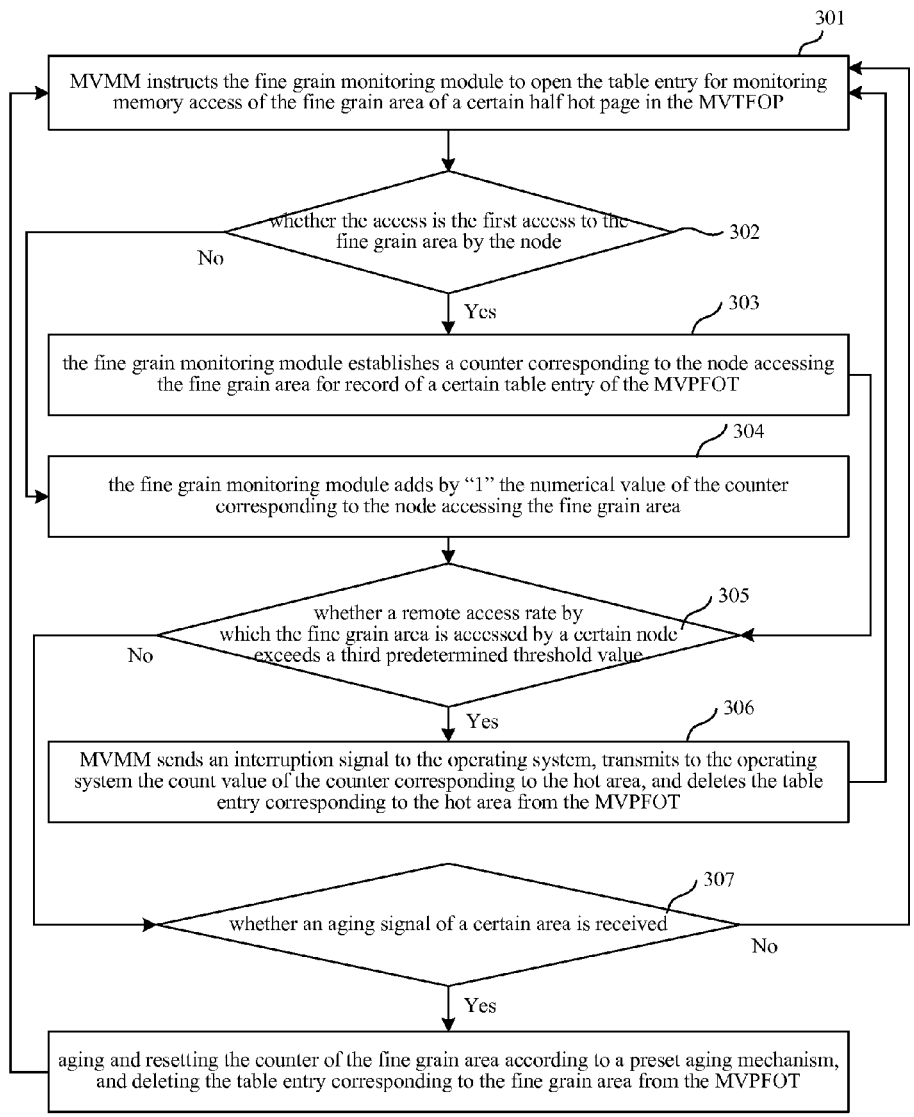
FIG. 2d shows a schematic diagram illustrating a fine grain monitoring in the memory access monitoring method according to the second embodiment of the present application.

FIG. 2d shows a schematic diagram illustrating a fine grain monitoring in the memory access monitoring method according to the second embodiment of the present application. As shown in FIG. 2d, further, the specific process in which the fine grain monitoring module monitors a fine grain area of the half hot page divided by address areas after the fine grain monitoring module opens the table entries in the MVTFOP for performing fine grain monitoring on the half hot page in step 208 may comprise the following steps:

Step 301—the MVMM of the NC chip can instruct the fine grain monitoring module to open the table entries for monitoring memory access of the fine grain area of a certain half hot page in the MVTFOP, and the MVMM can instruct the fine grain monitoring module to perform fine grain monitoring on local memory pages accessed by nodes. For example, once the RMVMFOP unit of the MVMM of the NC chip detects a remote access to a certain fine grain area of the half hot page or once the LMVMFOP unit detects a local access to a certain fine grain area of the half hot page, it is possible to instruct the fine grain monitoring module to perform fine grain monitoring on the local memory pages accessed by nodes.

Step 302—the fine grain monitoring module determines whether the access is the first access to the fine grain area by the node. If yes, step 303 is executed, otherwise step 304 is executed.

Step 303—the fine grain monitoring module establishes a counter corresponding to the node accessing the fine grain area for record of a certain table entry of the MVPFOT, and step 305 is executed.

Step 304—since the record of the certain table entry of the MVPFOT already has a counter corresponding to the node accessing the fine grain area, the fine grain monitoring module can add by "1" the count value of the counter corresponding to the node accessing the fine grain area, and step 305 is executed.

Step 305—the fine grain monitoring module determines whether a remote access rate by which the fine grain area is accessed by a certain node exceeds a third predetermined threshold value according to each counter of the fine grain area in the MVPFOT. If yes, it is determinable that the fine grain area is a hot area, and step 306 is executed, otherwise step 307 is executed.

Step 306—the MVMM sends an interruption signal to the operating system, transmits to the operating system the count value of the counter corresponding to the hot area, and deletes the table entry corresponding to the hot area from the MVPFOT. The operating system performs an optimized migration for the hot area, for example, by migrating the content stored in the hot area to a remote memory corresponding to the remote node for storage. Then the process returns to execute step 301 for continued fine grain monitoring.

Step 307—an aging module (memory page age message) determines whether an aging signal of a certain area is received. If yes, the counter of the fine grain area is aged and reset according to a preset aging mechanism, and the process returns to execute step 301 after the table entry corresponding to the fine grain area is deleted from the MVPFOT, otherwise the process directly returns to step 301.

The NC chip in this embodiment is merely exemplary rather than restrictive, as it is also possible to execute the memory access monitoring method not on the NC chip, but by an interconnection bus or other interconnection devices in the NUMA architecture.

The combination of coarse grain monitoring and fine grain monitoring is employed in the memory access monitoring method according to this embodiment, whereby the coarse grain monitoring is firstly performed, the fine grain monitoring is then performed on the hot page obtained by the coarse grain monitoring, and table entries are established in the MVPFOT only corresponding to half hot pages accessed by remote nodes, so as to reduce the number of counters, thus making it possible not only to achieve large coverage of memory access monitoring with relatively low hardware overhead, but also to perform fine grain monitoring on essential data pages, to effectively recognize the cross-nodes hot area which needs to be optimized, and to enhance the memory access optimization efficiency in NUMA architecture when applied in the NUMA architecture.

Third Embodiment

Figure 3:
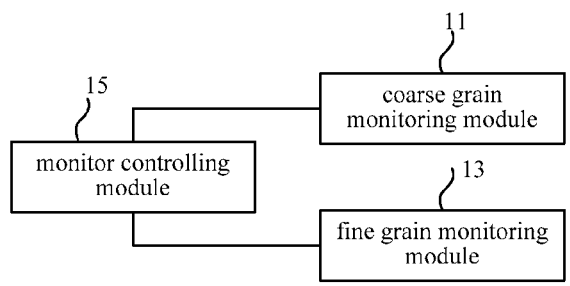
FIG. 3 shows a structural schematic diagram illustrating a memory access monitoring device according to a third embodiment of the present application.

FIG. 3 shows a structural schematic diagram illustrating a memory access monitoring device according to a third embodiment of the present application. As shown in FIG. 3, the memory access monitoring device may specifically comprise:

a coarse grain monitoring module 11 for performing coarse grain monitoring on local memory pages, if a hot page with coarse grain monitoring exists in the local memory pages, instructing a monitor controlling module to request an operating system to perform an optimized migration for the content of the hot page, and if a half hot page with coarse grain monitoring exists in the local memory pages, initiating by the monitor controlling module a fine grain monitoring to the half hot page;

a fine grain monitoring module 13 for performing fine grain monitoring on the half hot page, and if a hot area with fine grain monitoring exists in the half hot page, instructing the monitor controlling module to request the operating system to perform an optimized migration for the content of the hot area; and the monitor controlling module 15 for instructing the coarse grain monitoring module 11 to initiate coarse grain monitoring to local memory pages, and requesting the operating system to perform the optimized migration for the content of the hot page monitored by the coarse grain monitoring module 11, if the coarse grain monitoring module 11 monitors that the half hot page with coarse grain monitoring exists in the local memory pages, instructing the fine grain monitoring module 13 to initiate the fine grain monitoring to the half hot page, and requesting the operating system to perform the optimized migration for the content of the hot area monitored by the fine grain monitoring module 13.

Specifically, this embodiment of the present application comprises the monitor controlling module 15, the coarse grain monitoring module 11 and the fine grain monitoring module 13, of which the coarse grain monitoring module 11 can locate hot pages, if a remote access rate by which a certain coarse grain page is accessed by a remote node exceeds a predetermined threshold value, this coarse grain page is a hot page; the monitor controlling module 15 can notify the operating system through interruption or other ways, and transmit to the operating system count values monitored by each counter corresponding to the hot page, whereby it is possible for the operating system to execute an optimized migration strategy for the hot page, for example by migrating the content of the hot page to a remote memory corresponding to the remote node for storage. The coarse grain monitoring module 11 can further locate half hot pages, if a remote access rate by which a certain coarse grain page is accessed by a single remote node does not exceed a predetermined threshold value, but a total remote access rate by which the coarse grain page is accessed by plural remote nodes exceeds a predetermined threshold value, this coarse grain page is a half hot page, and the monitor controlling module 15 can instruct the fine grain monitoring module 13 to perform fine grain monitoring on the half hot page. If the fine grain monitoring module 13 performs fine grain monitoring on the half hot page, and it is found that an access rate by which a certain fine grain area is accessed by a certain remote node exceeds a predetermined threshold value, the fine grain area is a hot area, and the monitor controlling module 15 can notify the operating system through interruption or other ways, and transmit to the operating system count values of each counter of the hot area, whereby it is possible for the operating system to execute an optimized migration strategy for the hot page, for example by migrating the content of the hot area to a remote memory corresponding to the remote node for storage.

The combination of coarse grain monitoring and fine grain monitoring is employed in the memory access monitoring method according to this embodiment, whereby the coarse grain monitoring is firstly performed, and the fine grain monitoring is then performed on the hot page obtained by the coarse grain monitoring, so as to reduce the number of counters required by memory access monitoring, thus making it possible not only to achieve large coverage of memory access monitoring with relatively low hardware overhead, but also to perform fine grain monitoring on essential data pages, to effectively recognize the cross-nodes hot area which needs to be optimized, and to enhance the memory access optimization efficiency in NUMA architecture when applied in the NUMA architecture.

Fourth Embodiment

Figure 4:
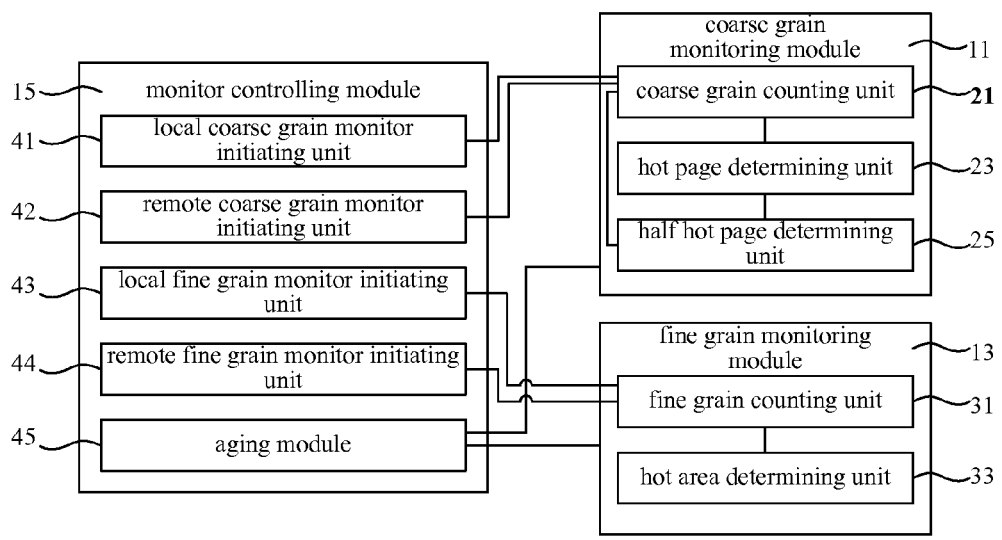
FIG. 4 shows a structural schematic diagram illustrating a memory access monitoring device according to a fourth embodiment of the present application.

FIG. 4 shows a structural schematic diagram illustrating the memory access monitoring device according to a fourth embodiment the present application. As shown in FIG. 4, the coarse grain monitoring module 11 of the memory access monitoring device may specifically comprise:

a coarse grain counting unit 21 for storing, in a table entry of a coarse grain monitoring table, a count value of each counter corresponding to each node accessing a coarse grain page in a system respectively, the coarse grain page being obtained by coarse grain dividing the local memory pages;

a hot page determining unit 23 for determining, according to access amount by which each node in the system accesses a coarse grain page, whether a remote access rate by which the coarse grain page is accessed by a remote node exceeds a first predetermined threshold value. If yes, the coarse grain page is a hot page, and the operating system is requested to perform the optimized migration for the content of the hot page;

a half hot page determining unit 25 for determining, if the remote access rate by which the coarse grain page is accessed by a remote node does not exceed the first predetermined threshold value, whether a total remote access rate by which the coarse grain page is accessed by all remote nodes exceeds a second predetermined threshold value. If yes, the coarse grain page is a half hot page, and the fine grain monitoring to the half hot page is initiated.

Moreover, the fine grain monitoring module 13 comprises:

a fine grain counting unit 31 for storing, in a table entry of a fine grain monitoring table, a count value of each counter corresponding to each node accessing a fine grain area in a system, the fine grain area is obtained by fine grain dividing the half hot page;

a hot area determining unit 33 for determining, according to access amount by which each node in the system accesses a fine grain area, whether a remote access rate by which the fine grain area is accessed by a remote node exceeds a third predetermined threshold value, if yes, the fine grain area is a hot area, and the operating system is requested to perform the optimized migration for the content of the hot area.

Furthermore, the monitor controlling module 15 may comprise:

a local coarse grain monitor initiating unit 41 for initiating, if a local node in the system accessing a coarse grain page is detected, a count value of a counter in the coarse grain monitoring module 11 corresponding to the local node accessing the coarse grain page to be added by "1"; see the LMPVM unit in FIG. 2b and the relevant description in FIG. 2c;

a remote coarse grain monitor initiating unit 42 for indicating, if a remote node in the system accessing a coarse grain page is detected, a count value of a counter in the coarse grain monitoring module 11 corresponding to the remote node accessing the coarse grain page to be added by "1"; see the RMPVM unit in FIG. 2b and the relevant description in FIG. 2c;

a local fine grain monitor initiating unit 43 for initiating, if a local node in the system accessing a fine grain page is detected, a count value of a counter in the coarse grain monitoring module 11 corresponding to the local node accessing the fine grain page to be added by "1"; see the LMVMFOP unit in FIG. 2b and the relevant description in FIG. 2d; and a remote fine grain monitor initiating unit 44 for initiating, if a remote node in the system accessing a fine grain page is detected, a count value of a counter in the coarse grain monitoring module 11 corresponding to the remote node accessing the fine grain page to be added by "1"; see the RMVMFOP unit in FIG. 2b and the relevant description in FIG. 2d.

Additionally, the monitor controlling module 15 may also comprise: an aging module 45 for resetting, if an aging signal of the coarse grain page is received, each counter to which the coarse grain page corresponds, and deleting the table entry corresponding to the coarse grain page from the coarse grain monitoring table; or resetting, if an aging signal of the fine grain area is received, each counter to which the fine grain area corresponds, and deleting the table entry corresponding to the fine grain area from the fine grain monitoring table.

Refer to the foregoing descriptions about the embodiments of the methods for the operational flows and working principles of each module and unit in this embodiment, and no repetition will be made here.

The combination of coarse grain monitoring and fine grain monitoring is employed in the memory access monitoring method according to this embodiment, whereby the coarse grain monitoring is firstly performed, and the fine grain monitoring is then performed on the hot page obtained by the coarse grain monitoring, so as to reduce the number of counters required by memory access monitoring, thus making it possible not only to achieve large coverage of memory access monitoring with relatively low hardware overhead, but also to perform fine grain monitoring on essential data pages, to effectively recognize the cross-nodes hot area which needs to be optimized, and to enhance the memory access optimization efficiency in NUMA architecture when applied in the NUMA architecture.

Persons ordinarily skilled in the art can understand that the entire or portion of the steps of the aforementioned method embodiments can be achieved by a program instruction related hardware, and the program can be stored in a computer-readable storage medium and, when executed, executes the steps of the aforementioned method embodiments. The storage medium includes such various media capable of storing program codes as an ROM, an RAM, a magnetic disk, or an optical disk etc.

As should be noted, the foregoing embodiments are merely used to explain the technical solutions of the present application, rather than to restrict the present application. Although the present application is described in detail with reference to the foregoing embodiments, it should be understood to persons ordinarily skilled in the art that it is still possible to modify the technical solutions recorded in the foregoing embodiments, or to equivalently replace portions of the technical features thereof. All such modifications or replacements do not make the corresponding technical solutions to essentially depart from the spirits and scopes of the technical solutions of the embodiments of the present application.

What is claimed is:

1. A memory access monitoring method, comprising:
    performing coarse grain monitoring on access circumstances of nodes for local memory pages, wherein the coarse grain monitoring further comprises if a first remote access rate exceeds a first predetermined threshold value then determining that a coarse grain page obtained by coarse grain dividing the local memory pages is a hot page, wherein the coarse grain page which is under the coarse grain monitoring is accessed by a first remote node by the first remote access rate;
    migrating content of the hot page to a first remote memory corresponding to the first remote node;
    if the first remote access rate by which the coarse grain page is accessed by the first remote node does not exceed the first redetermined threshold value, then determining whether a total remote access rate exceeds a second predetermined threshold value, wherein the coarse grain page is accessed by all remote nodes by the total remote access rate; if the total remote access rate exceeds the second predetermined threshold value, then the coarse grain page is a half hot page; and
    performing fine grain monitoring on the half hot page, wherein the fine grain monitoring comprises monitoring a fine grain area of the half hot page and the coarse grain page is larger than a memory space occupied by the fine grain area.

2. The memory access monitoring method according to claim 1, wherein the coarse grain monitoring comprises:
    storing, in a table entry of a coarse grain monitoring table, a count value of each counter corresponding to the number of times each node accessing the coarse grain page in a system.

3. The memory access monitoring method according to claim 1, wherein the fine grain monitoring comprises:
    storing, in a table entry of a fine grain monitoring table, a count value of each counter corresponding to the number of times each node accessing the fine grain area in a system, the fine grain area is obtained by fine grain dividing the half hot page; and
    determining, according to an access amount by which each node in the system accesses the fine grain area, whether a second remote access rate by which the fine grain area is accessed by a second remote node exceeds a third predetermined threshold value, if the second remote access rate exceeds the third predetermined threshold value, then the fine grain area is a hot area; and
    migrating the content of the hot area to a second remote memory corresponding to the second remote node.

4. The memory access monitoring method according to claim 1, further comprising:
    if a local node in a system accessing the coarse grain page is detected, initiating a count value of a counter in a coarse grain monitoring module corresponding to a count value of each counter corresponding to the local node accessing the coarse grain page to be added by "1";
    if the first remote node in the system accessing the coarse grain page is detected, instructing the count value of the counter in the coarse grain monitoring module corresponding to the remote node accessing the coarse grain page to be added by "1";
    if the local node in the system accessing the fine grain page is detected, initiating the count value of the counter in the coarse grain monitoring module corresponding to the local node accessing the fine grain page to be added by "1"; and
    initiating, if the first remote node in the system accessing the fine grain page is detected, the count value of the counter in the coarse grain monitoring module corresponding to the remote node accessing the fine grain page to be added by "1".

5. The memory access monitoring method according to claim 1, further comprising:
    resetting, if an aging signal of the coarse grain page is received, each counter to which the coarse grain page corresponds, and deleting the table entry corresponding to the coarse grain page from the coarse grain monitoring table; or
    resetting, if an aging signal of the fine grain area is received, each counter to which the fine grain area corresponds, and deleting the table entry corresponding to the fine grain area from the fine grain monitoring table.

6. A memory access monitoring device, comprising:
    a coarse grain monitoring module, configured to perform coarse grain monitoring on access circumstances of nodes for local memory pages, wherein the coarse grain monitoring module comprises:
        a hot page determining unit, configured to determine, if a first remote access rate exceeds a first predetermined threshold value, that a coarse grain page obtained by coarse grain dividing the local memory pages to be a hot page, wherein the coarse grain page which is under the coarse grain monitoring is accessed by a first remote node by the first remote access rate; and
        a half hot page determining unit, configured to determine, if the first remote access rate by which the coarse am sage is accessed by the first remote node does not exceed the first predetermined threshold value, whether a total remote access rate exceeds a second predetermined threshold value, wherein the coarse grain page is accessed by all remote nodes by the total remote access rate; if the total remote access rate exceeds the second predetermined threshold value, then the coarse grain page is a half hot page;

a fine grain monitoring module, configured to perform fine grain monitoring on the half hot page, wherein the fine grain monitoring comprises monitoring a fine grain area of the half hot page and the coarse grain page is larger than a memory space occupied by the fine grain area; and the monitor controlling module, configured to instruct the coarse grain monitoring module to initiate coarse grain monitoring to local memory pages, and request an operating system to migrate content of the hot page monitored by the coarse grain monitoring module to a first remote memory corresponding to the first remote node, and if the coarse grain monitoring module monitors that the half hot page exists in the local memory pages, instruct the fine grain monitoring module to initiate the fine grain monitoring to the half hot page.

7. The memory access monitoring device according to claim 6, wherein the coarse grain monitoring module further comprises:

a coarse grain counting unit, configured to store, in a table entry of a coarse grain monitoring table, a count value of each counter corresponding to the number of times each node accessing the coarse grain page in a system, the coarse grain page is obtained by coarse grain dividing the local memory pages.

8. The memory access monitoring device according to claim 6, wherein the fine grain monitoring module comprises:

a fine grain counting unit, configured to store, in a table entry of a fine grain monitoring table, a count value of each counter corresponding to the number of times each node accessing the fine grain area in a system, the fine grain area is obtained by fine grain dividing the half hot page; and a hot area determining unit, configured to determine, according to an access amount by which each node in the system accesses the fine grain area, whether a second remote access rate by which the fine grain area is accessed by a second remote node exceeds a third predetermined threshold value, if the second remote access rate by which the fine grain area is accessed by the remote node exceeds the third predetermined threshold value, then the fine grain area is a hot area, and the operating system is requested to migrate the content of the hot area to a remote memory corresponding to the remote node.

9. The memory access monitoring device according to claim 6, wherein the monitor controlling module comprises:

a local coarse grain monitor initiating unit, configured to initiate, if a local node in a system accessing the coarse grain page is detected, a count value of a counter in the coarse grain monitoring module corresponding to the local node accessing the coarse grain page to be added by "1";

a remote coarse grain monitor initiating unit, configured to initiate, if the first remote node in the system accessing a coarse grain page is detected, the count value of a counter in the coarse grain monitoring module corresponding to the remote node accessing the coarse grain page to be added by "1";

a local fine grain monitor initiating unit, configured to initiate, if the local node in the system accessing the fine grain page is detected, the count value of the counter in the coarse grain monitoring module corresponding to the local node accessing the fine grain page to be added by "1"; and a remote fine grain monitor initiating unit, configured to initiate, if the first remote node in a system accessing the fine grain page is detected, the count value of the counter in the coarse grain monitoring module corresponding to the remote node accessing the fine grain page to be added by "1".

10. The memory access monitoring device according to claim 6, wherein the monitor controlling module further comprises:

an aging module, configured to reset, if an aging signal of the coarse grain page is received, each counter to which the coarse grain page corresponds, and delete the table entry corresponding to the coarse grain page from the coarse grain monitoring table, or reset, if an aging signal of the fine grain area is received, each counter to which the fine grain area corresponds, and delete the table entry corresponding to the fine grain area from the fine grain monitoring table.

11. A memory access monitoring method, comprising:

determining that a coarse grain page obtained by coarse grain dividing local memory pages is a hot page when a first remote access rate exceeds a first predetermined threshold value, wherein the coarse grain page is accessed by a first remote node at the first remote access rate;

migrating content of the hot page to a first remote memory corresponding to the first remote node;

determining the coarse grain page is a half hot page when a total remote access rate exceeds a second predetermined threshold value when first remote access rate does not exceed the first predetermined threshold value, wherein the coarse grain page is accessed by all remote nodes at the total remote access rate; and performing fine grain monitoring on the half hot page, wherein the fine grain monitoring comprises monitoring a fine grain area of the half hot page, and the coarse grain page is larger than a memory space occupied by the fine grain area.

12. The memory access monitoring method according to claim 11 further including:

storing, in a table entry of a coarse grain monitoring table, a count value of each counter corresponding to the number of times each node accessing the coarse grain page in a system.

13. The memory access monitoring method according to claim 11 further including:

storing, in a table entry of a fine grain monitoring table, a count value of each counter corresponding to the number of times each node accessing the fine grain area in a system, the fine grain area is obtained by fine grain dividing the half hot page.

14. The memory access monitoring method according to claim 13 further including:

determining the fine grain area is a hot area when a second remote access rate by which the fine grain area is accessed by a second remote node exceeds a third predetermined threshold value, migrating the content of the hot area to a second remote memory corresponding to the second remote node.

15. The memory access monitoring method according to claim 11 further comprising:

detecting a local node accessing the coarse grain page and incrementing a count value of a counter corresponding to the local node; and detecting a remote node accessing the coarse grain page and incrementing a count value of a counter corresponding to the local node.

16. The memory access monitoring method according to claim 11, further comprising:

resetting each counter to which the coarse grain page corresponds when an aging signal of the coarse grain page is received and deleting a table entry corresponding to the coarse grain page from the coarse grain monitoring table.

17. The memory access monitoring method according to claim 11, further comprising:
resetting each counter to which the fine grain area corresponds when the aging signal of the fine grain area is received and deleting the table entry corresponding to the fine grain area from the fine grain monitoring table.

* * * * *